United States Patent

[11] 3,616,393

| [72] | Inventor | Bernard Grushkin<br>Pittsford, N.Y. |
|---|---|---|
| [21] | Appl. No. | 789,104 |
| [22] | Filed | Jan. 2, 1969 |
| [45] | Patented | Oct. 26, 1971 |
| [73] | Assignee | Xerox Corporation<br>Rochester, N.Y. |

[54] PHOTOELECTROPHORETIC IMAGING PROCESS EMPLOYING A PIGMENT HAVING THE FORMULA $R_2N_4S_3$
4 Claims, 1 Drawing Fig.

[52] U.S. Cl..................................................... 204/181,
96/1 R, 96/1.2, 96/1.3, 96/88, 106/288 Q,
260/354, 260/367, 260/378
[51] Int. Cl....................................................... B01k 5/00
[50] Field of Search............................................. 96/1, 1.3,
1.5, 1.2, 88; 204/181; 106/288; 260/354, 367, 378

[56] References Cited
UNITED STATES PATENTS
| 3,384,565 | 5/1968 | Tulagin et al................. | 204/181 |
| 3,384,566 | 5/1968 | Clark........................... | 204/181 |

*Primary Examiner*—Charles E. Van Horn
*Attorneys*—James J. Ralabate, David C. Petre and Richard A. Tomlin

ABSTRACT: Methods of employing a compound having the formula $R_2N_4S_3$ wherein R is selected from the group consisting of a substituted or unsubstituted fluorenyl, anthryl, dibenzocycloheptenyl or indenyl group in electrophoretic imaging processes are disclosed.

PATENTED OCT 26 1971   3,616,393
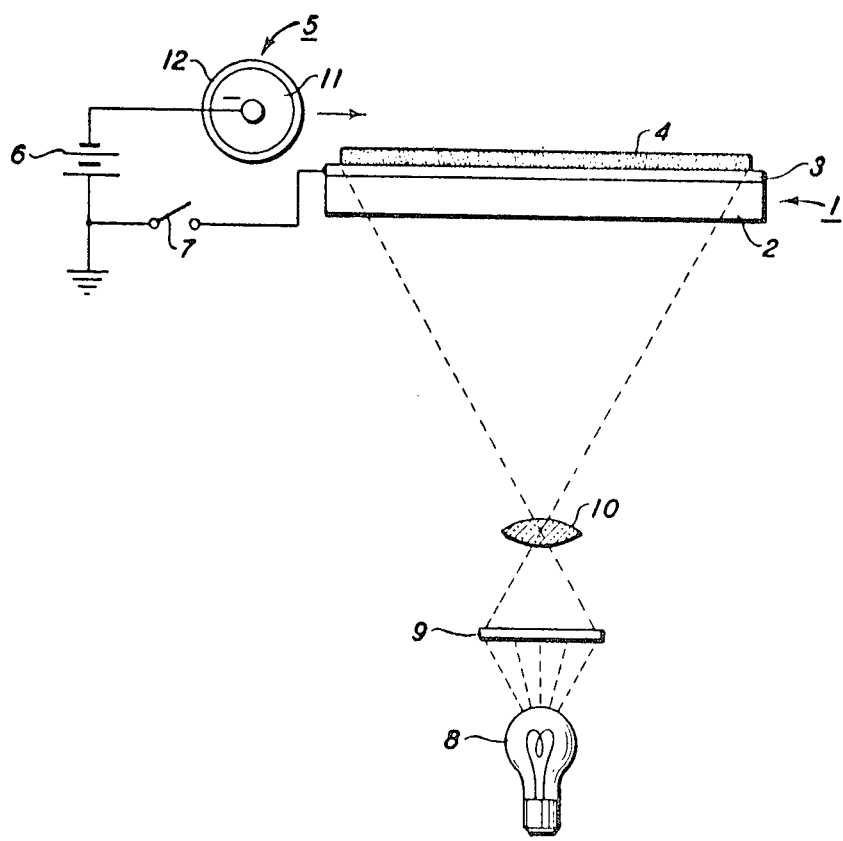
INVENTOR.
BERNARD GRUSHKIN
BY
ATTORNEY

PHOTOELECTROPHORETIC IMAGING PROCESS EMPLOYING A PIGMENT HAVING THE FORMULA $R_2N_4S_3$

BACKGROUND OF THE INVENTION

This invention relates, in general, to pigments having the general formula $R_2N_4S_3$ and, more specifically, to the use of said pigments in photoelectrophoretic imaging systems.

There has been recently developed an electrophoretic imaging system capable of producing color images which utilizes single-component photoconductive particles. This process is described in detail and claimed in U. S. Pat. Nos. 3,384,565, 3,384,566 and 3,384,488. In such an imaging system, variously colored light absorbing particles are suspended in a nonconductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be electrically photosensitive and which apparently undergo a net change in charge polarity upon exposure to activating electromagnetic radiation, through interaction with one of the electrodes. In a monochromatic system, particles of a single color are used, producing a single colored image equivalent to conventional black-and-white photography. In a polychromatic system, the images are produced in natural color because mixtures of particles of two or more different colors which are each sensitive to light of a specific wavelength or narrow range of wavelengths are used. Particles used in this system must have both intense pure colors and be highly photosensitive. The pigments of the prior art often lack the purity and brilliance of color, the high degree of photosensitivity, and/or the preferred correlation between the peak spectral response and peak photosensitivity necessary for use in such a system.

It is, therefore, an object of this invention to provide photoelectrophoretic imaging processes utilizing photosensitive pigment particles which overcome the above-noted deficiencies.

Another object of this invention is to provide highly photosensitive particles for use in electrophoretic imaging systems.

Still another object of this invention is to provide photoelectrophoretic imaging processes capable of producing color images.

SUMMARY THE INVENTION

The foregoing objects, and others, are accomplished in accordance with this invention, generally speaking, by providing an electrophoretic imaging process employing a compound having the formula: $R_2N_4S_3$ wherein R is selected from the group consisting of a fluorenyl, anthryl, dibenzocycloheptenyl, or indenyl group thereof. This particular class of pigments has been found to have electrically photosensitive or photomigratory characteristics such as to make them especially useful in photoelectrophoretic imaging systems.

While any of the class of pigments having the above-described general formula may be used in phototelectrophoretic imaging systems, it is preferred to employ those compounds wherein R is a fluorenyl or anthryl group, since these materials have especially pure color and are highly photosensitive for use in electrophoretic imaging processes. Optimum results are achieved when R is a fluorenyl group. The pigments of the present invention may have other compositions added thereto to sensitize, enhance, synergize, or otherwise modify its properties.

The use of the pigments of the present invention in photoelectrophoretic imaging processes may be further understood by reference to the FIG. which shows an exemplary electrophoretic imaging system.

Referring now to the FIG., there is seen a transparent electrode generally designated 1 which, in this exemplary instance, is made up of a layer of optically transparent glass 2 overcoated with a thin optically transparent layer 3 of tin oxide, commercially available under the name NESA glass. This electrode will hereafter be referred to as the "injecting" electrode. Coated on the surface of injecting electrode 1 is a thin layer 4 of finely divided photosensitive particles dispersed in an insulating liquid carrier. The term "photosensitive" for the purposes of this application, refers to the properties of a particle which, once attracted to the injecting electrode, will migrate away from it under the influence of an applied electric field when it is exposed to actinic electromagnetic radiation. For a detailed theoretical explanation of the apparent mechanism of operation of the invention, see the above-mentioned U. S. Pat. Nos. 3,384,565, 3,384,566 and 3,384,488, the disclosures of which are incorporated herein by reference. Liquid suspension 4 may also contain a sensitizer and/or a binder for the pigment particles which is at least partially soluble in the suspending or carrier liquid as will be explained in greater detail below. Adjacent to the liquid suspension 4 is a second electrode 5, hereinafter called the "blocking electrode" which is connected to one side of the potential source 6 through a switch 7. The opposite side of potential source 6 is connected to the injecting electrode 1 so that when switch 7 is closed, an electric field is applied across the liquid suspension 4 between electrodes 1 and 5. An image projector made up of a light source 8, a transparency 9, and a lens 10 is provided to expose the dispersion 4 to a light image of the original transparency 9 to be reproduced. Electrode 5 is made in the form of a roller having a conductive central core 11 connected to the potential source 6. The core is covered with a layer of a blocking electrode material 12, which may be Baryta paper. The pigment suspension is exposed to the image to be reproduced while a potential is applied across the blocking and injecting electrodes by closing switch 7. Roller 5 is caused to roll across the top surface of injecting electrode 1 with switch 7 closed during the period of image exposure. This light exposure causes exposed pigment particles originally attracted to electrode 1 to migrate through the liquid and adhere to the surface of the blocking electrode, leaving behind a pigment image on the injecting electrode surface which is a duplicate of the original transparency 9. After exposure, the relatively volatile carrier liquid evaporates off, leaving behind the pigment image. This pigment image may then be fixed in place as, for example, by placing a lamination over its top surface or by virtue of a dissolved binder material in the carrier liquid such as paraffin wax or other suitable binder that comes out of solution as the carrier liquid evaporated. About 3 to 6 percent by weight of paraffin binder in the carrier has been found to produce good results. The carrier liquid itself may be liquified paraffin wax or other suitable binder. In the alternative, the pigment image remaining on the injecting electrode may be transferred to another surface and fixed thereon. As explained in greater detail below, this system can produce either monochromatic or polychromatic images depending upon the type and number of pigments suspended in the carrier liquid and the color of light to which this suspension is exposed in the process.

Any suitable insulating liquid may be used kerosene the carrier for the pigment particles in the system. Typical carrier liquids are decane, dodecane, N-tetradecane, paraffin, beeswax or other thermoplastic materials, Sohio Odorless Solvent 3440, (a kerosene fraction available from Standard Oil Company of Ohio and Isopar—G, (a long chain saturated aliphatic hydrocarbon available from Humble Oil Company of New Jersey). Good quality images have been produced with voltages ranging from 300 to 5,000 volts in the apparatus of the FIG.

In a monochromatic system, particles of a single composition are dispersed in the carrier liquid and exposed to a black-and-white image. A single color results, corresponding to conventional black-and-white photography. In a polychromatic system, the particles are selected so that those of different colors respond to different wavelengths in the visible spectrum corresponding to their principal absorption bands. Also, the pigments should be selected so that their spectral response curves do not have substantial overlap, thus allowing for color separation and subtractive multicolor image formation. In a typical multicolor system, the particle dispersion should include cyan colored particles sensitive mainly to red light, magenta particles sensitive mainly to green light and yellow colored particles sensitive mainly to blue light. When mixed together in a carrier liquid, these particles produce a black appearing liquid. When one or more of the particles are caused to migrate from base electrode 1 toward an upper electrode, they leave behind particles which produce a color equivalent to the color of the impinging light. Thus, for example, red light exposure causes the cyan-colored pigment to migrate, leaving behind the magenta and yellow pigments which combine to produce red in the final image. In the same manner, blue and green colors are reproduced by removal of yellow and magenta, respectively. When white light impinges upon the mix, all pigments migrate, leaving behind the color of the white or transparent substrate. No exposure leaves behind all pigments which combine to produce a black image. This is an ideal technique of subtractive color imaging in that the particles are not only each composed of a single component, but in addition, they perform the dual functions of final image colorant and photosensitive medium.

It has been found that the class of pigments discussed above having the general formula $R_2N_4S_3$ are surprisingly effective when used in either a single or multicolor electrophoretic imaging system. Their good spectral response and high photosensitivity result in dense, brilliant images.

Any suitable different-colored photosensitive pigment particles having the desired spectral responses may be used with the pigments of this invention to form a partial suspension in a carrier liquid for color imaging. From about 2 to about 10 percent pigment by weight have been found to produce good results. The addition of small amounts (generally ranging from 0.5 to 5 mol percent) of electron donors or acceptors to the suspensions may impart significant increases in system photosensitivity.

THe following examples further specifically define the present invention with respect to the use of the compositions of the general formula given above in electrophoretic imaging processes. Parts and percentages are by weight unless otherwise indicated. The examples below are intended to illustrate various preferred embodiments of the electrophoretic imaging process of the present invention.

DESCRIPTION OF PREFERRED EMBODIMENTS

The following examples are carried out in an apparatus of the general type illustrated in the FIG. with the imaging mix 4 coated on a NESA glass substrate through which exposure is made. The NESA glass surface is connected in series with a switch, a potential source, and the conductive center of a roller having a coating of Baryta paper on its surface. The roller is approximately 2½ inches in diameter and is moved across the plate surface at about 1.45 centimeters per second. The plate employed is roughly 3 inches square and is exposed with a light intensity of 8,000 foot candles as measured on the uncoated NESA glass surface. Unless otherwise indicated, 7 percent by weight of the indicated pigments in each example are suspended in Sohio Odorless Solvent 3440 and the magnitude of the applied potential is 2,500 volts. All pigments which have a relatively large particles size as made are ground in a ball mill for 48 hours to reduce their size to provide a more stable dispersion which improves the resolution of the final images. The exposure is made with a 3,200° K. lamp through a positive transparency.

EXAMPLE I

About seven parts of a pigment having the formula:

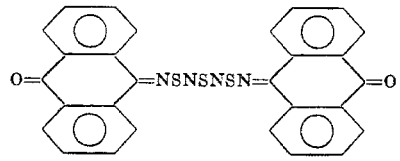

are suspended in about 100 parts Sohio Odorless Solvent 3440, a kerosene fraction available from Standard Oil Company of Ohio. The suspension is coated onto the NESA glass and a negative potential is imposed on the roller electrode. The plate is exposed to an image through a positive black-and-white transparency. An image of good resolution and density in violet-and-white, corresponding to the original black-and-white image is produced on the NESA glass surface.

EXAMPLE II

About seven parts of the pigment having the formula:

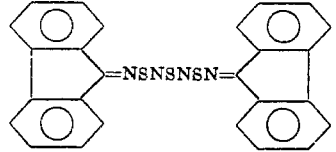

are suspended in about 100 parts Sohio Odorless Solvent 3440. The suspension is coated onto the NESA glass and a negative potential is imposed on the roller electrode. The plate is exposed as in example I. An excellent monochromatic image corresponding to the original results.

EXAMPLE III

About seven parts of a pigment having the formula:

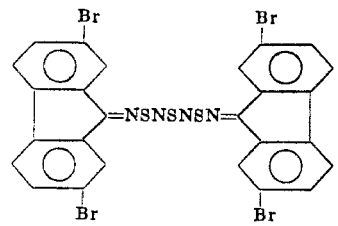

are suspended in about 100 parts Sohio Odorless Solvent 3440. The suspension is coated onto the NESA glass surface and a negative potential is imposed on the roller electrode. The plate is exposed as in example I. A good monochromatic image corresponding to the original results.

EXAMPLE IV

About eight parts of a pigment having the formula:

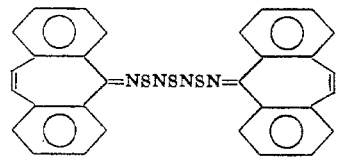

are suspended in about 100 parts Sohio Odorless Solvent 3440. The suspension is coated onto the NESA glass and a negative potential is imposed on the roller electrode. The plate is exposed as in example I. A very good monochromatic image corresponding to the original results.

In each of the examples V—VII, below, a suspension including equal amounts of three colored pigments is made by dispersing the pigments in finely divided form in Sohio Odorless Solvent 3440 so that the pigments constitute 8 percent by weight of the mixture. The mixture may be referred to as a "-trimix." The trimixes are individually tested by coating them on the NESA glass plate and exposing them as in example I above, except that a multicolor "kodachrome" transparency is used in place of the black-and-white transparency. Thus, a multicolored image is projected on the plate as the roller electrode moves across the surface thereof. A Baryta paper blocking electrode is employed and the roller is held at a negative potential of about 2,500 volts. The roller is passed over the plate six times, with removal of adhering particles from the blocking electrode surface between passes. After completion of the six passes, the quality of the image upon the plate is evaluated as to the image density and color purity.

EXAMPLE V

The trimix comprises a cyan pigment Cyan Blue GTNF, the beta form of copper phthalocyanine, C. I. No. 74160, available from Collway Colors Co.; a yellow pigment, Indofast Yellow Toner, flavanthrone, C. I. No. 70600, available from Harmon Colors Co.; and the magenta pigment described in example I. When exposed, as discussed above, this trimix produces a full color image corresponding to the original with excellent density and color separation characteristics.

EXAMPLE VI

The trimix comprises a cyan pigment, Diane Blue, 3,3'-methoxy-4,4'-diphenyl-bis(1" azo-2"hydroxy-3"-naphthanilide) C.I. No. 21180, available from Harmon Colors Co.; a yellow pigment, Algol Yellow GC, 1,2,5,6-di(C,C'-diphenyl)-thiazole-anthraquinone, C. I. No. 67300, available from General Dyestuffs Co.; and the magenta pigment, described in example I. When exposed as discussed above, this trimix produces a multicolor image corresponding to the original having very good density and color purity.

EXAMPLE VII

The trimix comprises a cyan pigment, a polychloro substituted copper phthalocyanine, C. I. No. 74250, available from Imperial Color and Chemical Co.; a yellow pigment, 8.13-dioxodinaphtho (1,2-2',3')-furan-6-carbox-p-methoxy anilide; and a magenta example described in Example I. When exposed as discussed above, this trimix produces a full color image characteristics. to the original having excellent color density and excellent color purity characteristics As shown by the above examples, the class of pigments of the present invention having the general formula $R_2N_4S_3$, in general, are suitable for use in electrophoretic imaging processes. Since their photographic speed, density characteristics and color characteristics vary, a mixture of the particular pigments may be preferred for specific uses. Some characteristics of the pigments may be improved by particular purification processes, recrystallization processes and dye sensitization.

Although specific components and proportions have been described in the above examples, other suitable materials, as listed above, may be used with similar results. In addition, other materials may be added to the pigment compositions to synergize, enhance, or otherwise modify their properties. The pigment compositions of this invention may be dye sensitized, if desired, or may be mixed with other photosensitive materials, both organic and inorganic.

Other modifications and ramifications of the present invention will occur to those skilled in the art upon a reading of the present disclosure. These are intended to be included within the scope of this invention.

What is claimed is:

1. A method of photoelectrophoretic imaging comprising:
   a. providing a layer of an imaging suspension comprising electrically photosensitive particles in an insulating liquid between at least two electrodes, at least one electrode is at least partially transparent;
   b. exposing said suspension to a pattern of electromagnetic radiation to which at least a portion of said particles are sensitive; and,
   c. applying an electrical field across said suspension until an image made up of migrated particles is formed; said particles comprising particles of a pigment said pigment being both the primary photosensitive ingredient and the primary colorant for the particles said pigment being of a material having the formula RNSNSNSNR wherein R is selected from the group consisting of fluorenyl, anthryl, dibenzocycloheptenyl, and indenyl.

2. The method of claim 1 wherein said imaging suspension comprises particles of at least one other color each particle of one color having a spectral response curve which does not substantially overlap the spectral response curve of the remainder of the particles.

3. The method of claim 1 wherein said R is fluorenyl.

4. The method of claim 1 wherein said R is anthryl.

* * * * *